United States Patent [19]
Ikeda et al.

[11] Patent Number: 5,267,385
[45] Date of Patent: Dec. 7, 1993

[54] AUTOMATIC ASSEMBLY APPARATUS

[75] Inventors: Yuzi Ikeda; Ryo Niikawa; Shigeo Kaibuki; Shinpei Watanabe, all of Sayama, Japan

[73] Assignee: Honda Giken Kogyo Kabushiki Kaisha, Tokyo, Japan

[21] Appl. No.: 614,041

[22] Filed: Nov. 9, 1990

Related U.S. Application Data

[63] Continuation of Ser. No. 357,921, May 30, 1989, abandoned.

[30] Foreign Application Priority Data

Jun. 3, 1988 [JP] Japan ............... 63-135619

[51] Int. Cl.$^5$ ............................................. B21D 39/03
[52] U.S. Cl. ....................................... 29/429; 29/430; 29/33 P; 29/563
[58] Field of Search ............... 414/792.9, 744; 29/771, 29/783, 785, 792, 784, 791, 793, 799, 824, 429, 430, 33 P, 563; 901/6, 7, 30, 41

[56] References Cited

U.S. PATENT DOCUMENTS

| | | | |
|---|---|---|---|
| 4,453,303 | 6/1984 | Leddet | 29/407 |
| 4,553,309 | 11/1985 | Hess et al. | 29/450 |
| 4,703,558 | 11/1987 | Mäkinen | 29/784 |
| 4,728,383 | 3/1988 | Kaller et al. | 29/430 X |
| 4,773,810 | 9/1988 | Nishimura et al. | 414/792.9 X |

FOREIGN PATENT DOCUMENTS

0117899A2  9/1984  European Pat. Off.
0170086A2  2/1986  European Pat. Off.

*Primary Examiner*—Joseph M. Gorski
*Attorney, Agent, or Firm*—Armstrong, Westerman, Hattori, McLeland & Naughton

[57] ABSTRACT

An automatic assembling apparatus having two identical assembling jigs. One assembling jig is attached to a robot arm and the assembling jig is then moved by operation of a robot from a setting site to an assembling site for assembling a plurality of parts set thereon at the setting site to an article place at the assembling site. Simultaneously, the plurality of parts are set on the other assembling jig. The two units are alternately attached to the robot arm at the setting site. Two receiving tables, each of which is for mounting thereon each of the assembling jigs, are provided alongside of each other at the setting site. A transfer device is provided to transfer each assembling jig from one receiving table to the other receiving table. The assembling jig attached to the robot arm is detached from the robot arm and placed on the one receiving table and the other assembling jig mounted on the other receiving table is then attached to the robot arm.

4 Claims, 3 Drawing Sheets

AUTOMATIC ASSEMBLY APPARATUS

This application is a continuation of application Ser. No. 357,921 filed May 30, 1989, now abandoned.

BACKGROUND OF THE INVENTION

This invention relates to an automatic assembling apparatus for assembling a plurality of parts to an article.

An assembling apparatus has been previously proposed for assembling a plurality of automobile parts such as a roof lining, a rearview mirror, a cabin lamp, etc., to a car body, wherein an assembling jig carrying these parts is connected to an arm of a robot, and the assembling jig is then moved by operation of the robot from a setting site to an assembling site and inserted into the cabin of the car body placed at the assembling site to assemble these parts which were set in advance on the assembling jig to the cabin ceiling portion of the car body.

Generally in an automatic assembling apparatus, it is usual that parts are set on a setting jig placed at a setting site while the assembling step is being performed at an assembling site. When the assembling jig is returned to the setting site, those parts set on the setting jig are transferred onto the assembling jig. In such an assembling apparatus as the above-mentioned one for assembling parts to the cabin ceiling portion, however, it is necessary to set relatively small-sized parts such as the rearview mirror, the cabin lamp, etc. placed underneath a roof lining or the large-sized part, so that it is difficult to have the setting jig hold the small-sized parts in place thereon because the roof lining is obstructive in this case.

In the apparatus proposed, therefore, the small-sized parts and the roof lining to be placed above them are set directly on the assembling jig when it is returned to the setting site. In this arrangement, however, the time required to carry out the setting step constitutes a time loss which is detrimental to a further improvement in productivity.

In view of the foregoing, the present invention has for its object to provide an automatic assembling apparatus that enables the assembling step to be performed efficiently without such a time loss resulting from the setting step even when no setting jig is used.

SUMMARY OF THE INVENTION

To attain the above object, the present invention provides an automatic assembling apparatus in which an assembling jig is attached to a robot arm and the assembling jig is then moved by operation of a robot from a setting site to an assembling site for assembling a plurality of parts set thereon at the setting site to an article placed at the assembling site, the apparatus being characterized in that it has at least two identical units of an assembling jig, the two units being alternately attached to the robot arm at the setting site.

While one assembling jig connected to the robot arm is moved to the assembling site and the assembling step using that one assembling jig is being performed there, a plurality of parts are set on the other assembling jig remaining at the setting site. When the first assembling jig is returned to the setting site after completing the assembling step at the assembling site, the robot arm is disconnected therefrom and connected to the other assembling jig at the setting site.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

The accompanying drawings show an embodiment of the present invention in which the present invention is applied to an assembling apparatus for assembling a roof lining B, a rearview mirror C, a cabin lamp D, at least one grab rail E, and a sun visor F to the cabin ceiling portion of a car body A.

Figure 1:
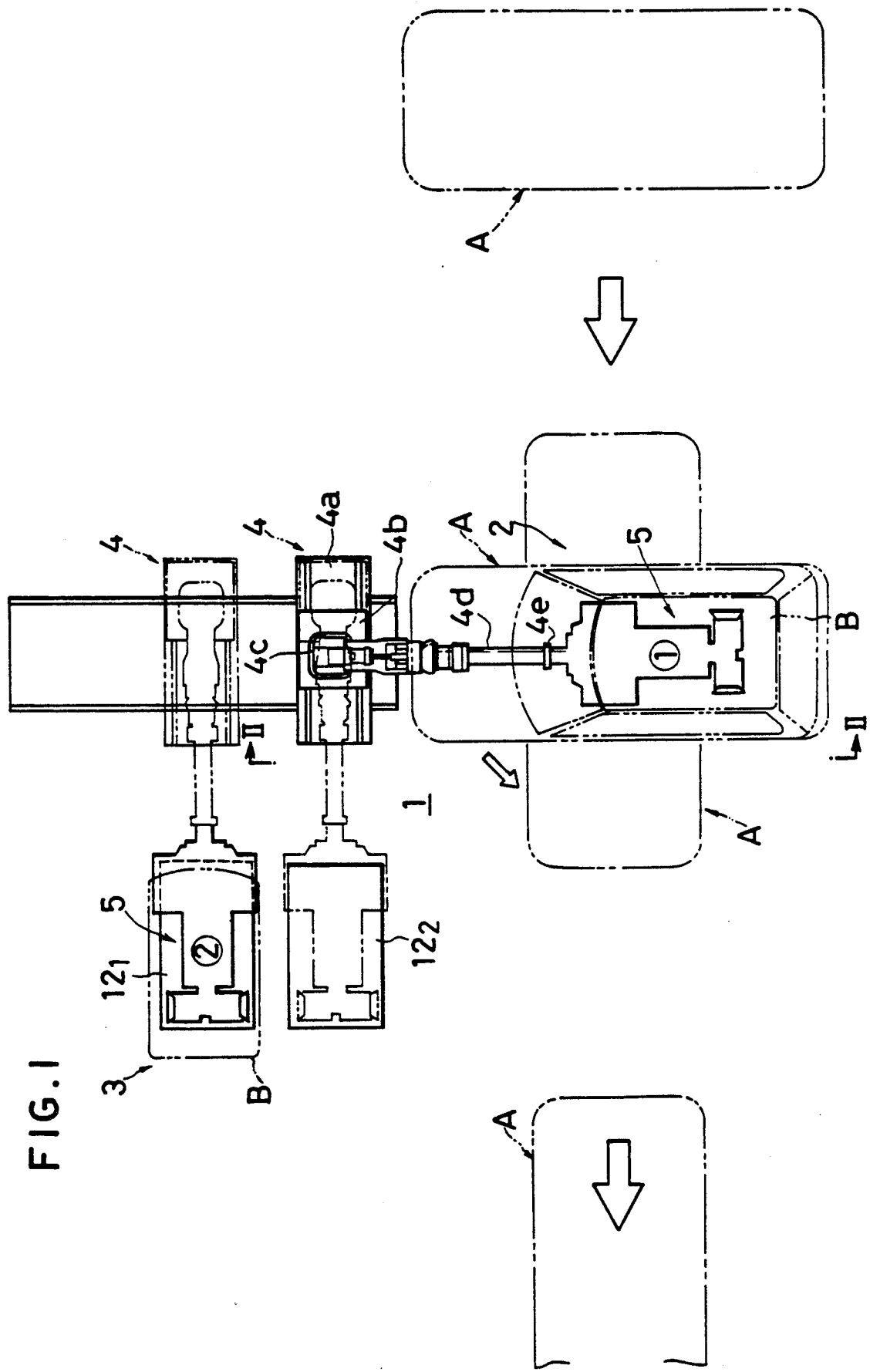
FIG. 1 is an overall top plan view of an automatic assembling apparatus according to one embodiment of the present invention.
Figure 2:
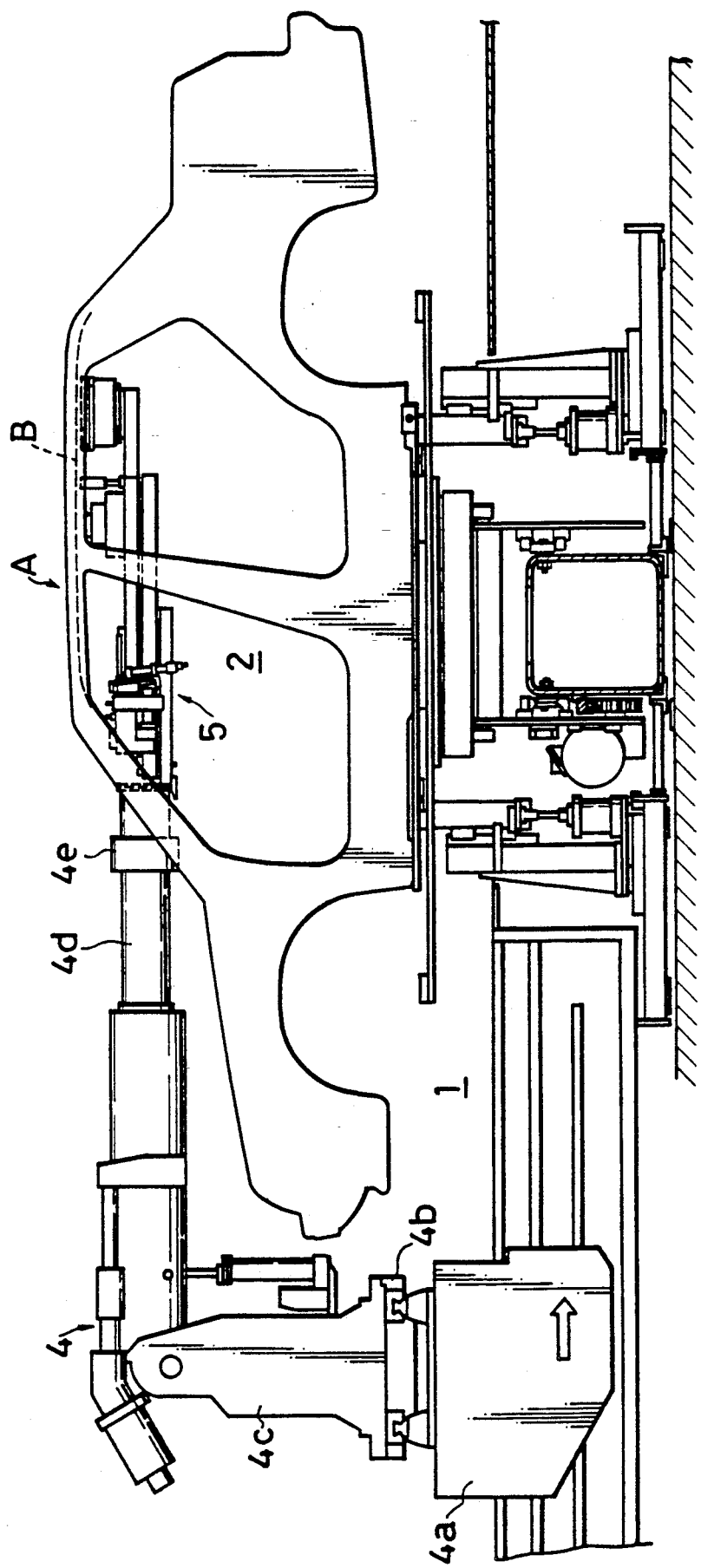
FIG. 2 is a side view thereof taken along line II—II in FIG. 1.

Referring to FIG. 1, an assembling station 1 is provided on the way along an automobile assembly line. The car body A is placed at a predetermined assembling site 2 in the assembling station 1 in such a way that its lengthwise direction may be perpendicular to the longitudinal direction of the assembly line. A robot 4 is operated to move an assembling jig 5 from a setting site 3 located at one side of the assembling site 2 to the assembling site 2 and, as shown in FIG. 2, the assembling jig 5 is inserted into the cabin through the front window of the car body A to assemble to the cabin ceiling portion a plurality of such interior parts as the roof lining and others.

The robot 4 comprises a first slide table 4a that is movable back and forth in the lengthwise direction of the car body A, a second slide table 4b which is mounted on the first slide table 4a and movable back and forth in the width wise direction of the car body A, a robot body 4c which is mounted on the second slide table 4b and turnable about the vertical axis line thereof, and a robot arm 4d which is attached to the robot body 4c and vertically swingable. The assembling jig 5 is detachably connected to the front end of the robot arm through a chuck member 4e.

Figure 3:
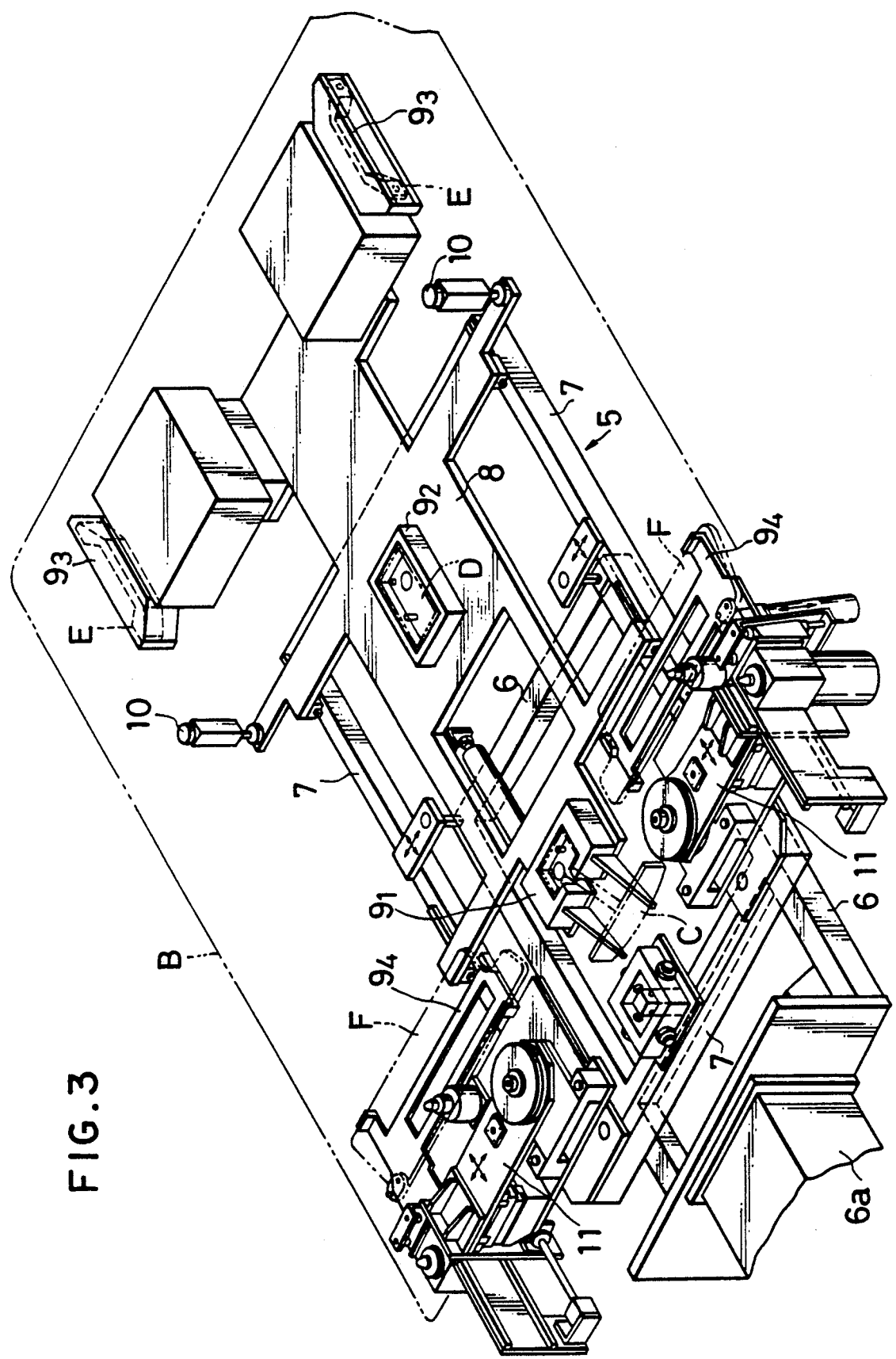
FIG. 3 is a perspective view of the assembling jig.

As shown in FIG. 3, each assembling jig 5 comprises a base frame 6 having a front-end arm 6a clamped by the chuck member 4e, a floating frame 7, a jig frame 8 mounted on the base frame 6 through the floating frame 7, setting units $9_1$, $9_2$ and $9_3$ for the rearview mirror C, the cabin lamp D and grab rail E, respectively, and a pair of receiving seats 10 for the roof lining B, all of which are provided on the jig frame 8, and a setting unit $9_4$, for a sun visor F. The setting unit $9_4$ is provided on the floating frame 7 through a sub-floating frame 11. Using nut runners (not shown) provided on these setting units $9_1$ through $9_4$, the roof lining B and such small-sized parts as the cabin lamp D and others are concurrently fastened to the cabin ceiling portion.

Two units of the same assembling jig 5 are included in the apparatus. Further, a pair of a first and a second receiving tables $12_1$, $12_2$, each of which is for mounting thereon each assembling jig 5, are provided alongside of each other in the setting site 3, so that the assembling jig 5 can be transferred by an appropriate transfer means (not shown) from the second receiving table $12_2$ located closer to the assembling site 2 to the first receiving table $12_1$ located further out.

Now, the operating steps according to the above embodiment example will be explained.

While the first assembling jig 5 indicated by ① in FIG. 1 is moved to the assembling site 2 and the assembling step is going on there, the setting units $9_1$ through $9_4$ on the second assembling jig 5 placed on the first receiving table $12_1$ and indicated by ② are loaded with a rearview mirror C, a cabin lamp D, grab rails E and sun visors F, respectively, and a roof lining B is set above them.

After completion of the above assembling step, the robot 4 is operated to return the first ① assembling jig 5 from the assembling site 2 to the setting site 3 and mount the first jig onto the second receiving table $12_2$. Next, the chuck means 4e is opened to release the first assembling jig 5 from the robot arm 4d and thereafter the robot arm 4d is moved to the first receiving table $12_1$ to clamp the second ② assembling jig 5 by means of the chuck member 4e.

In the meantime, the car body A for which the above assembling work has been completed is turned to have its lengthwise direction aligned with the longitudinal direction of the assembly line and then conveyed out of the assembling station 1. Thereafter, another car body A is brought into the station, stopped, and set positioned at the assembling site 2.

Next, the second ② assembling jig 5 is lifted up from the first receiving table $12_1$ and moved to the assembling site 2 for assembling a roof lining B and those small-sized parts such as a rearview mirror C, etc., set thereon to the cabin ceiling portion of the car body A. On the other hand, the first ① assembling jig 5 is transferred onto the first receiving table $12_1$ to have a roof lining B and those small-sized parts such as a rearview mirror C, etc. set thereon.

The foregoing operations are repeated to attach the first ① and second ② assembling jigs 5 alternately to the robot arm 4d and continuously perform the above-described assembling steps.

It is possible to set those parts on the assembling jig 5 without relocating the jig from the second receiving table $12_2$ to the first receiving table $12_1$. However, performing such setting step according to the above embodiment of the present invention is more advantageous in that it enables an assembly worker to perform the setting step at the same one location and thus alleviates his workload.

As described in the foregoing, according to the present invention, while one assembling jig is moved to the assembling site and the assembling step is being performed there, the setting work to set those parts on the other assembling jig remaining at the setting site is carried out, so that a next round of the assembling work can be readily started simply by changing connection of the robot arm from one assembling jig to the other one when the assembling step using said one assembling jig has been completed. This enables the assembly step to be performed continuously and efficiently without time loss that could otherwise result from the setting work even when no setting jig is used.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method for assembling a plurality of parts onto an article wherein first and second identical assembling jig units are provided for respective first and second setting sites and wherein a single robot arm is provided for moving said assembling jigs, said method comprising:

attaching said first assembling jig unit to said robot arm;

moving said first assembling jig unit to an assembling site;

assembling said parts from said first assembling jig unit onto an article located at the assembling site;

returning said first assembling jig unit to said first setting site;

detaching said first assembling unit from said robot arm;

stocking said second assembling jig unit with parts, during said attaching, moving, assembling, returning and detaching steps above for said first assembling jig unit;

attaching said second assembling jig unit to said robot arm;

moving said second assembling jig unit to the assembling site;

assembling said parts from said second assembling jig unit onto another article located at the assembling site;

returning said second assembling jig unit to said second setting site;

detaching said second assembling unit from said robot arm;

stocking said first assembling jig unit with parts, during said attaching, moving, assembling, returning and detaching steps above for said second assembling jig.

2. The method according to claim 1, wherein two receiving tables are provided alongside each other at said first and second setting sites, for mounting thereon said first and second assembling jig units, respectively, further comprising:

placing said second said assembling jig units on one of said receiving tables;

placing said first assembling jig unit on the other receiving table, after said step of returning said first assembling jig unit to said first setting site;

detaching said first assembling jig unit from said robot arm; and attaching said second assembling jig unit, located on said one receiving table, to said robot arm.

3. The method according to claim 1, wherein the article is a car body, and the plurality of parts include a roof lining and small-sized parts which are to be assembled to a cabin ceiling portion of the car body, further comprising;

setting said small-sized parts and said roof lining on said first and second assembling jig units such that said roof lining is placed above said small-sized parts.

4. The method according to claim 2, wherein the article is a car body, and the plurality of parts include a roof lining and small-sized parts which are to be assembled to a cabin ceiling portion of the car body, further comprising;

setting said small-sized parts and said roof lining on said first and second assembling jig units such that said roof lining is placed above said small-sized parts.

* * * * *

UNITED STATES PATENT AND TRADEMARK OFFICE
CERTIFICATE OF CORRECTION

PATENT NO. : 5,267,385
DATED : December 7, 1993
INVENTOR(S) : Ikeda et al

It is certified that error appears in the above-indentified patent and that said Letters Patent is hereby corrected as shown below:

Column 4, Claim 1, line 5, "jigs" should read --jig units--;

lines 15 and 30, after "assembling" insert --jig--;

line 35, after "jig" insert --unit--.

Claim 2, line 6, delete "said" (second occurrence); same line change "units" to --unit--.

Signed and Sealed this

Sixteenth Day of August, 1994

BRUCE LEHMAN

Attest:

Attesting Officer

Commissioner of Patents and Trademarks